Sept. 1, 1925.                                               1,551,940
                     C. G. COOPER ET AL
                CONNECTING HEAD FOR GREASE GUNS
                       Filed Dec. 4, 1924
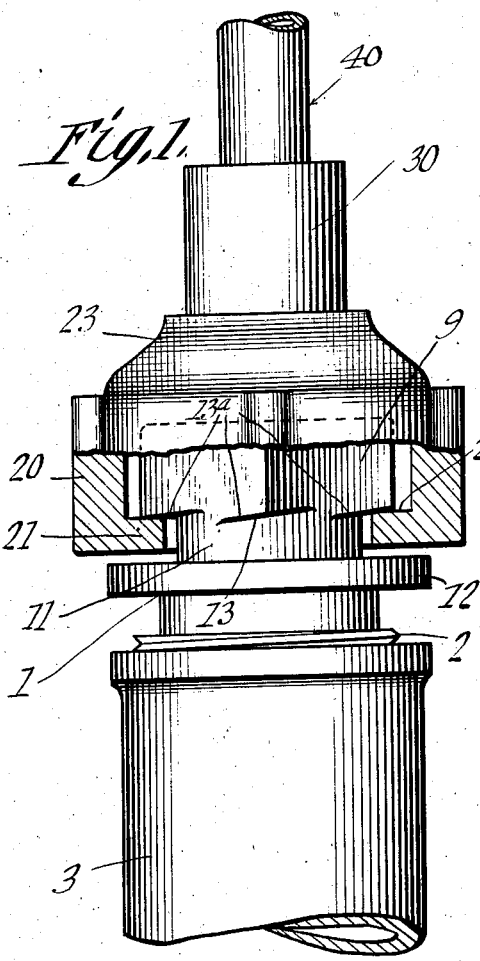
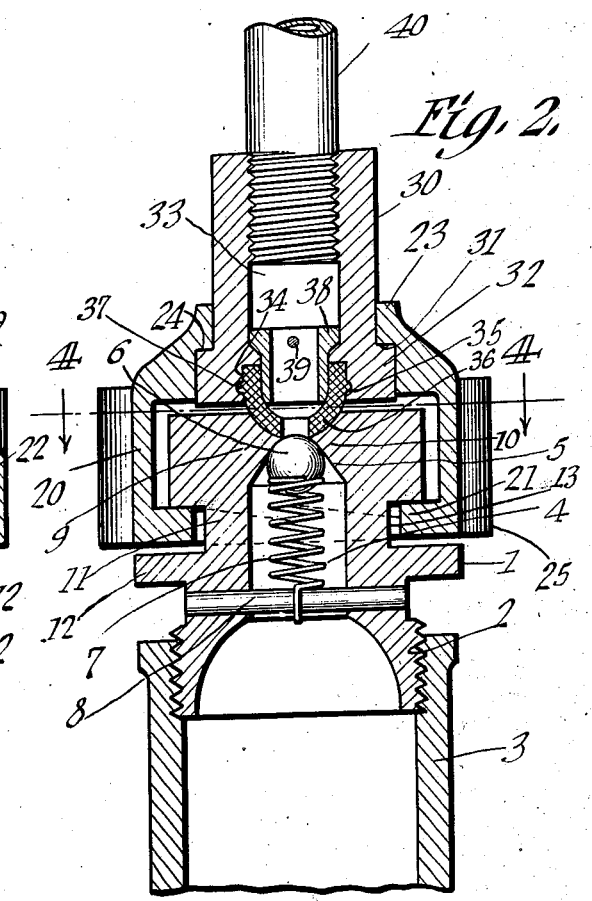
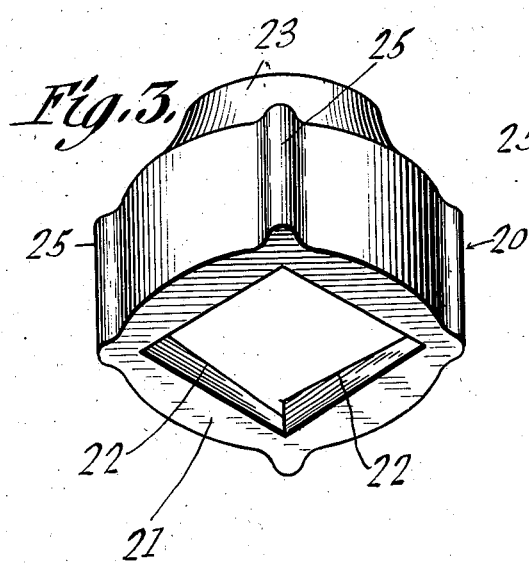
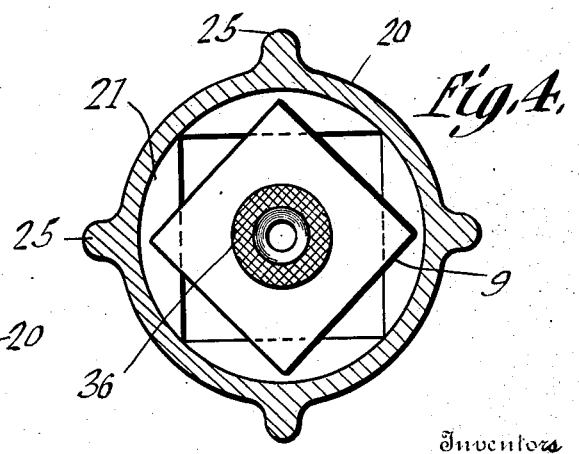
Inventors
C. G. Cooper AND
A. J. Dinkel
By
Attorneys Patented Sept. 1, 1925.

1,551,940

UNITED STATES PATENT OFFICE.

CHARLES G. COOPER AND ANDREW J. DINKEL, OF YUMA, ARIZONA.

CONNECTING HEAD FOR GREASE GUNS.

Application filed December 4, 1924. Serial No. 753,887.

*To all whom it may concern:*

Be it known that we, CHARLES G. COOPER and ANDREW J. DINKEL, citizens of the United States, residing at Yuma, in the county of Yuma and State of Arizona, have invented new and useful Connecting Heads for Grease Guns, of which the following is a specification.

This invention relates to heads for connecting grease guns with grease cup plugs.

The object of the invention is to provide a quick connecting head for a grease gun whereby the gun may be connected with a side rod grease cup plug for locomotives and the like.

Another object is to provide a head of this character and a grease cup plug constructed to co-operate with the head to provide for the gun being quickly connected with the plug and being held securely therewith during the filling of the plug with the grease.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of a grease cup plug with this improved head shown applied and partly in section;

Fig. 2 is a longitudinal section thereof;

Fig. 3 is a detail perspective view of the head taken from the bottom; and

Fig. 4 is a transverse section taken on the line 4—4 of Fig. 2.

In the embodiment illustrated a grease cup plug 1 is shown exteriorly threaded at 2 for insertion in the grease cup 3. This plug 1 has a reduced bore 4 extending longitudinally therethrough and is provided at its outer end with a valve seat 5 in which is mounted a ball valve 6 carried by a coiled spring 7 held in place by a pin 8 extending transversely through the plug as is shown clearly in Fig. 2.

It is obvious that the spring 7 forces the ball to its seat and normally holds it closed. This plug 1 is equipped with a square head 9 through which the bore 4 extends and which is provided in its outer face with a depression 10 for a purpose presently to be described.

A neck 11 connects the head 9 with the body of the plug and at the base of said neck is a laterally extending flange 12 whereby a groove 13 is formed between the upper face of said flange and the lower face of said head and which is designed to receive an inturned flange 21 of the connecting head 20 presently to be more fully described. The lower face of the corners of the head 9 are inclined as shown at 13ª similar to a screw, the incline here shown being the same as a screw having two threads per inch.

The inturned flange 21 has its inner face also provided with inclined surfaces 22 of the same pitch as those 13ª of the plug and which form in connection with the plug 20 a locking or clamping effect when the head is partly rotated.

The head 20 which is made hollow has a reduced tubular extension 23 at the end opposite the flange carrying end and said extension is equipped at its inner portion on the inner face thereof with a shoulder 24 designed to interlockingly engage with a shoulder 31 formed on the connecting sleeve 30 which unites the plug 1 with the grease gun 40.

The tubular extension 23 of the head 20 at the rear of the shoulder 24 is of a size to fit a head or collar 32 formed on the sleeve 30 as is shown clearly in Fig. 2. The head 20 is also provided with a plurality of radially extending ribs 25 to facilitate its application and removal.

The connecting sleeve 30 has a bore 33 here shown tapped to receive a one-half inch pip 40 which constitutes a part of the grease gun. The sleeve 30 is provided in the head 32 thereof with an annular recess 34 having an annular groove 35 in its side wall to receive a rib 37 on a gasket 36. This gasket 36 is held in place by a sleeve 38 which securely holds the gasket in position and insures a perfect fit at all times between the sleeve 30 and the plug 1 and which may be easily moved up and down in bore 33. A pin 39 in sleeve 38 is designed to move the sleeve up and down.

This connection head which is primarily intended for connecting a grease gun with a locomotive side rod grease cup plug may obviously also be used in connection with any other grease cup plug provided the plug be constructed to cooperate with the head in the manner above set forth.

In the use of this device the plug 1 having been screwed into the cup 3 and the connecting sleeve 30 screwed on to the pipe 40 of the grease gun, said sleeve has its head mounted in the recess 34 formed in the coupler head 20 of the plug 1 as is shown clearly in Fig. 2. The connecting head or coupler 20 is then passed over the plug head and engaged with the inclined corners thereof, it being understood that this plug was first placed on the sleeve 30 before its connection with the pipe 40.

The head 20 is normally carried by the sleeve 30 which is carried by the grease gun pipe 40 so that when it is desired to connect the grease gun with the cup plug all that is necessary is to insert this head over the head of the plug and to give a partial rotation which causes the inclined inner faces of the flange 21 to lockingly engage with the cooperating inclined faces 13 of the plug head and thus lock the gun securely to the cup, the gasket used in connection therewith preventing all possibility of any leakage of the grease no matter what pressure may be used to force the grease into the cup.

While the sleeve 30 is shown having threaded engagement with the gun pipe 40 obviously it need not necessarily be made in this manner but may be made in any other suitable or desired manner.

We claim:—

The combination with a grease cup plug and a gun connecting sleeve having registering bores therein, said sleeve having an annular recess with an annular groove in the side wall thereof, a cup-shaped gasket mounted in said recess and having a rib to fit in said groove, and a sleeve fitting in said gasket to hold it in operative position.

In testimony that we claim the foregoing as our own, we have hereto affixed our signatures.

CHARLES G. COOPER.
ANDREW J. DINKEL.